United States Patent [19]

Mizote

[11] Patent Number: 4,849,616
[45] Date of Patent: Jul. 18, 1989

[54] MAGNETIC DATA CARD READER
[75] Inventor: Hiroshi Mizote, Yamatokoriyama, Japan
[73] Assignee: Sharp Kabushiki Kaisha, Osaka, Japan
[21] Appl. No.: 193,664
[22] Filed: May 13, 1988
[30] Foreign Application Priority Data
 May 15, 1987 [JP] Japan .............................. 62-119839
[51] Int. Cl.$^4$ ............................................... G06K 7/08
[52] U.S. Cl. ...................................... 235/449; 235/493
[58] Field of Search ................................. 235/449, 493
[56] References Cited
U.S. PATENT DOCUMENTS
 4,256,956 5/1981 Hopkinson ........................... 235/449

Primary Examiner—Harold I. Pitts
Attorney, Agent, or Firm—Birch, Stewart, Kolasch & Birch

[57] ABSTRACT

The present invention discloses a card reading system for reading the recorded content of data recorded at least on one of the front and rear surfaces of a magnetic card including recording regions thereon. A first readout head reads the recording region provided on the front surface, a second readout head for reading the recording region provided on the rear surface, a first signal line for feeding a first readout signal from the first readout head, a second signal line for feeding a second readout signal from the second readout head, a first switch provided on the first signal line, a second switch provided on the second signal line, a circuit for designating priority for any of the first and second read signals. A priority changeover circuit changes the switching mode of the first and second switch means so that only the designated readout signal is output by the priority designating circuit when the first and second readout signals are input or when the signal corresponding to the designated readout signal is input and the readout signal is also output when a readout signal other than the signal corresponding to the designated readout signal is input.

3 Claims, 5 Drawing Sheets

MAGNETIC DATA CARD READER

BACKGROUND OF THE INVENTION

The present invention relates to a card reader or the like, and more specifically to a magnetic data card reader which reads the magnetically recorded content of a magnetic card such as a cash card or credit card.

The magnetic recording region of a magnetic card such as a cash card or credit card is specified in the three types as indicated in FIG. 7. For example, in the case of a magnetic card C1 indicated in FIG. 7A, a striped magnetic recording region 2a is provided on the surface 1a of the card. This magnetic card C1 is called a JBA type and is often used in banking or credit systems in Japan. In the case of a magnetic card C2 indicated in FIG. 7B, a striped magnetic recording region 2b is provided on the rear surface 1b of the card. This magnetic card C2 is called a ABA type and is used in foreign countries, particularly the USA. A magnetic card C3 indicated in FIG. 7C is called an international card. In the case of this card, the magnetic recording regions 2a, 2b where the same contents of data are recorded are provided on the front surface 1a and the rear surface 1b of the card.

For a readout operation of magnetic cards C1, C2, an exclusive type of magnetic card reader having only one readout head is used. Such an exclusive magnetic card reader cannot read data on the magnetic card C3.

Therefore, a so-called dual head type magnetic card reader having a pair of readout heads is used in order to read the data recorded on the magnetic card C3. In the case of the dual-head type magnetic card reader, any one of the ABA mode and JBA modes is preset from the keyboard and recorded data of any one of the magnetic recording regions 2a, 2b of the card C3 inserted are read in accordance with the preset mode. Accordingly, this dual-head type magnetic card reader is capable of reading the data of magnetic card C1 or C2 by setting the mode, in addition to the magnetic card C3.

In such prior art devices, if an operator erroneously sets the mode other than the read operation mode on the occasion of reading the magnetic card C1 or C2, the desired data cannot be read. Moreover, in such prior art an initial setting has been required by mode setting operations for any type of the decode software of controller for the reader (JBA and ABA type).

SUMMARY OF THE INVENTION

It is therefore an object of the present invention to provide a card reader or the like which solves the technical problems of the prior art explained previously and one which is capable of reading data recorded on a card which provides a variety of recording regions and also preferentially outputs the signal read out in one mode or the other.

Briefly, in accordance with the present invention, described is an apparatus for reading the recorded content of a recording region of a card or the like having recording regions in which the same content of data is recorded on the front or rear surfaces thereof, comprising:

a first readout head for reading a recording region provided on the front surface, a second readout head for reading a recording region provided on the rear surface, a first signal line for feeding a first readout signal from the first readout head, a second signal line for feeding a second readout signal from the second readout head, a first switch means provided on the first signal line, a second switch means provided on the second signal line, a means for preferentially designating any one of the first and second readout signals, and a priority changeover circuit which changes the switching mode of the first and second switch means so that only the designated readout signal is output by the designating means when the first and second readout signals are input or when the signal corresponding to the designated readout signal is input and the readout signal is output when the readout signal other than the signal corresponding to the designated readout signal is input.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
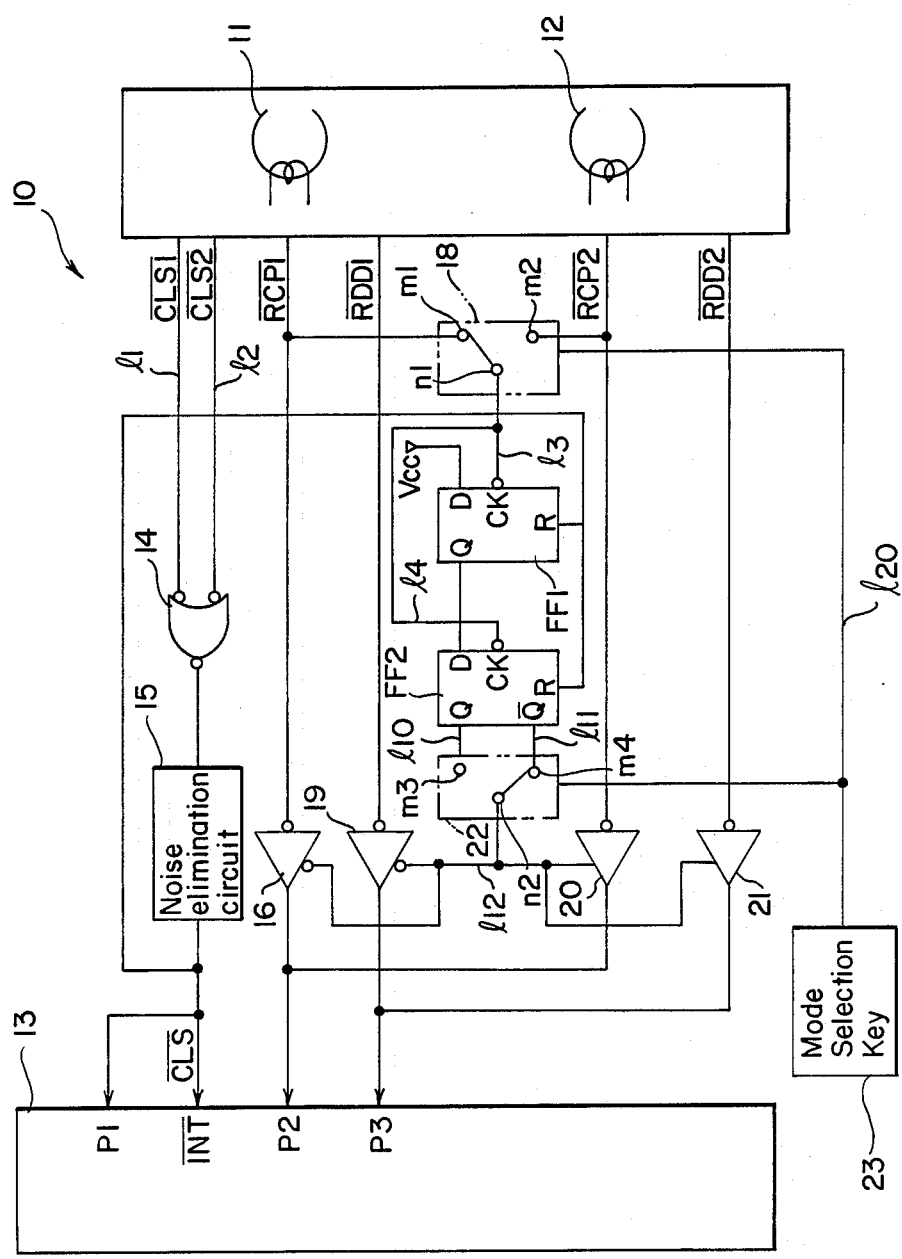
FIG. 1 is a block diagram indicating an electrical embodiment of a magnetic card reader according to the present invention.
Figure 7A:
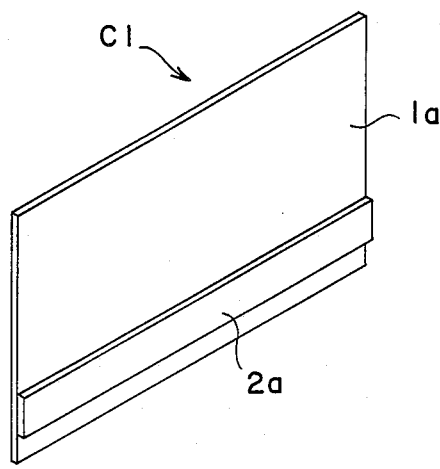
FIGS. 7A–7C are perspective views of the magnetic cards C1, C2, C3.
Figure 7B:
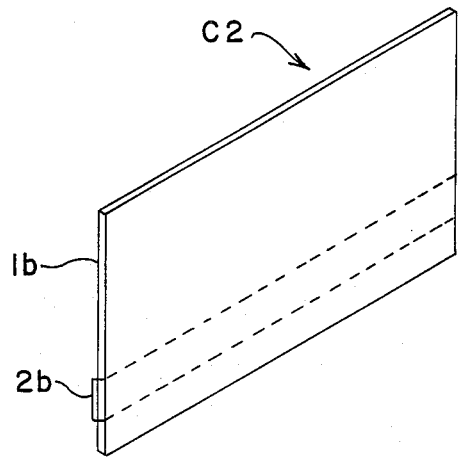
Figure 7C:
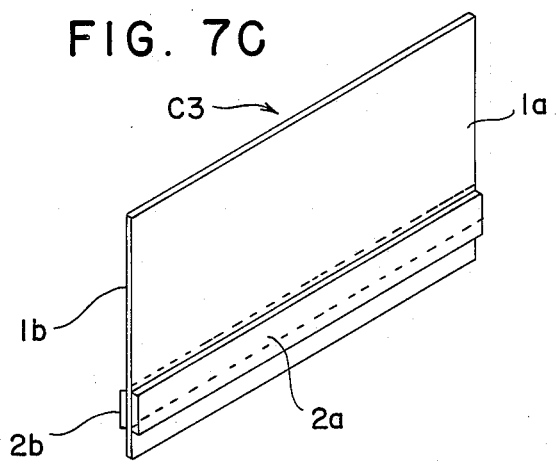

FIG. 1 is a block diagram illustrative of an electrical circuit of a magnetic card reader 10 in accordance with an embodiment of the present invention. The magnetic card reader 10 is used for reading any type of card C1 for JBA having a magnetic recording region 2a at the front surface 1a as shown in FIG. 7A, the card C2 for ABA having a magnetic recording region 2b at the rear surface 1b as shown in FIG. 7B, and the card C3 for international card (ABA/JBA) having magnetic recording regions 2a, 2b wherein the same content of data are recorded on both front and rear surfaces 1a and 1b as shown in FIG. 7C. The magnetic cards C1, C2, C3 are generally indicated by and referred to as the card C.

The magnetic card reader 10 comprises a first readout head 11 for reading the magnetic recording region 2a and a second readout head 12 for reading the magnetic recording region 2b. When a magnetic card C is inserted into the magnetic card reader, card insertion signals $\overline{CLS1}$, $\overline{CLS2}$ sent from the first and second readout heads 11, 12 are applied via lines 11 and 12 to the two inverting input terminals of an AND gate 14. The output from the AND gate 14 is inverted and applied to a noise elimination circuit 15 in order to eliminate noise. An output from the noise elimination circuit 15 is applied to an interrupt port $\overline{INT}$ of a control circuit 13 and is also applied to the port P1. In the control circuit 13, the interrupt port $\overline{INT}$ is activated when it is at a low level. After it is determined that the port P1 is in a low level for a predetermined period, it is also determined whether an interrupt signal is applied.

A data sampling pulse signal $\overline{RCP1}$ sent from the first readout head 11 is applied to a port P2 of the control circuit 13 through a tristate buffer 16. Moreover, the data sampling pulse signal $\overline{RCP1}$ sent from the first readout head 11 is applied to an individual contact m1 of a switch circuit 18. In addition, a readout data signal $\overline{RDD1}$ sent from the first readout head 11 is applied to port P3 of the control circuit 13 through second tristate buffer 19. The tristate buffers 16, 19 form a first switch means.

A data sampling pulse signal $\overline{RCP2}$ sent from the second readout head 12 is also applied to the port P2 of control circuit 13 through a tristate buffer 20. The data sampling pulse signal $\overline{RCP2}$ is likewise applied to an individual contact m2 of the switch circuit 18. A readout data signal $\overline{RDD2}$ sent from the second readout head 12 is furthermore applied to the port P3 of control circuit 13 through a tristate buffer 21. These tristate buffers 20, 21 form a second switch means. A common contact n1 of the switch circuit 18 is connected to the clock terminal CK of flip-flop FF1 through the line 13. This common contact n1 is also connected to the clock terminal CK of flip-flop FF2 through the line 14. The power supply voltage $V_{cc}$ is applied to an input terminal D of the flip-flop FF1. An output of an output terminal Q of flip-flop FF1 is then applied to the input terminal D of flip-flop FF2. The output terminal Q of flip-flop FF2 is connected to the individual contact m3 of switch circuit 22 through the line 110. In addition, an output from an output terminal $\overline{Q}$ of the flip-flop FF2 is connected to the individual contact m4 of the switch circuit 22 through the line 111. An output of the noise elimination circuit 15 is applied to each reset terminal R of the flip-flops FF1, FF2. The common contact n2 of the switch circuit 22 is connected to the control terminal of tristate buffers 16, 19 through the line 112 and is also connected to the control terminal of tristate buffers 20, 21. When the control terminal is of a low level, the tristate buffers 16, 19 become conductive, but when it is at a high level, the tristate buffers become nonconductive. When the control terminal is of a low level, the tristate buffers 20, 21 become nonconductive but when it is at a high level, these buffers become conductive.

The switch circuits 18, 22 are caused to change the switching mode thereof with the switching operation signal sent from a mode selection key 23.

The operation of the magnetic card reader 10 having such a structure will now be explained. First, when the JBA mode is selected by the selection input key 23, the line 120 goes to a high level, causing the relays 18 and 22 to switch, as shown, whereby the common contact n1 of the switch circuit 18 and the individual contact m1 become connected and the common contact n2 of the switch circuit 22 and the individual contact m4 become connected. Under this condition, when a JBA card C1 is inserted, for example, the card insertion signal $\overline{CLS1}$ becomes a low level and thereby causing the output of the AND gate 14 to become a low level, followed by the reset of the flip-flops FF1, FF2. Moreover, the data sampling pulse signal $\overline{RCP1}$ is applied to each input terminal CK of the flip-flop FF1 and flip-flop FF2. The output terminal Q of flip-flop FF1 latches the condition of the data input terminal D, namely the high level, at the first trailing edge of the data sampling pulse signal $\overline{RCP1}$. Accordingly, a high level signal is thereafter provided at the output terminal Q of the flip-flop FF1. Meanwhile, in the flip-flop FF2, since the input terminal D is a high level at the second trailing edge of the data sampling pulse signal $\overline{RCP1}$, the output terminal Q goes to a high level and the output terminal $\overline{Q}$ goes to a low level. Thereafter, a low level signal is output from the output termnal $\overline{Q}$. Thereby, the tristate buffers 16, 19 become conductive and the tristate buffers 20, 21 become nonconductive. As a result, the signals $\overline{RCP1}$ and $\overline{RDD1}$ are respectively applied to the ports P2, P3 of the control circuit 13 to read the readout data with the specified sampling pulse.

Next, when a JBA card C2 is inserted to the magnetic card reader 10, the card insertion signal $\overline{CLS2}$ becomes a low level signal and the interrupt terminal $\overline{INT}$ of the control circuit 13 is activated thereby. Simultaneously, the flip-flops FF1, FF2 are reset. At this time, the data sampling pulse signal $\overline{RCP1}$ remains in the high level state while the JBA card C2 is inserted and the flip-flop FF1 remains under a reset condition. Namely, the output terminal Q of the flip-flop FF1 is at a low level and therefore the output terminal $\overline{Q}$ of the flip-flop FF2 is at a high level. Accordingly, the tristate buffers 17, 19 become nonconductive, while the tristate buffers 20, 21 become conductive. Therefore, the data sampling pulse signal $\overline{RCP2}$ and the readout data signal $\overline{RDD2}$ sent from the second readout head 12 are coupled to the port P3 of the control circuit 13 and the sampling pulse signal $\overline{RDD2}$ of signal $\overline{RCP2}$ is read thereby. When a setting is made so that the JBA side has priority, the readout signal sent from the second readout head 12 is sent to the control circuit 13 only in case the first signal is not read out.

Next, when an international card C3 is inserted in the magnetic card reader 10, the first readout signal is read out by the first readout head 11 and the second readout signal is read by the second readout head 12. A card insertion signal $\overline{CLS1}$ is guided from the first readout head 11 through the line l1 and the card insertion signal $\overline{CLS2}$ is fed from the second readout head 12 through the line l2. The an output of the AND gate 14 is inverted thereby and a low level output is obtained. Accordingly, the interrupt port $\overline{INT}$ of the control circuit 13 is activated. Meanwhile, the low level signal resets the flip-flops FF1, FF2. Simultaneously, the sampling pulse signal $\overline{RCP1}$ from the first readout head 11 is input to the input terminal CK of the flip-flops FF1, FF2. The output terminal Q of the flip-flop FF1 is latched to its high level at the first trailing edge of the signal $\overline{RCP1}$. Therefore, the output terminal $\overline{Q}$ becomes low at the first trailing edge of the signal $\overline{RCP1}$ in the flip-flop FF2. The tristate buffers 16, 19 thereby become conductive and the tristate buffers 20, 21 become nonconductive. Accordingly, the sampling pulse signal $\overline{RCP1}$ and the readout data signal $\overline{RDD1}$ sent from the first readout head 11 are respectively applied to the ports P2, P3 of the control circuit 13 through the tristate buffers 16, 19. Therefore, the read data $\overline{RDD1}$ is read depending on the sampling pulse of the sampling pulse signal $\overline{RCP1}$.

Therefore, when the international card C3 is inserted as explained above, the first readout signal sent from the first readout head 11 is preferentially read by the processing circuit 13.

When the first readout signal fed from the first readout head 11 is read out while it is set preferentially as explained above, the first readout signal is directly applied to the processing circuit 13. When the first and second readout signals are simultaneously read, the first readout signal is preferentially applied to the processing circuit 13. Accordingly, even when an operator selects the ABA mode by mistake with the intension to select and designate the JBA mode in order to read the JBA magnetic card C1 and the JBA magnetic card C1 is inserted, the any signal read by the first readout head 11 and the second headout head 12 is applied to the control circuit 13 in order and therefore the magnetically recorded content can be read even if a mistake by an operator occurs.

Figure 2A:
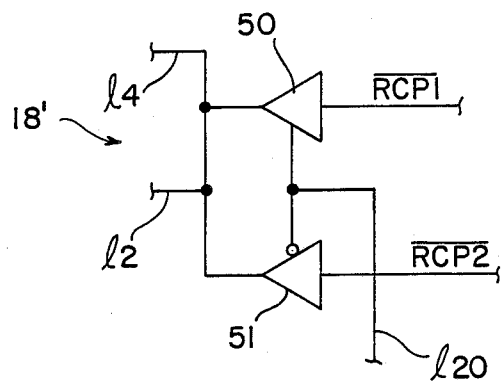
FIG. 2A is another embodiment of the switch circuit 18 included in the card reader shown in FIG. 1.
Figure 2B:
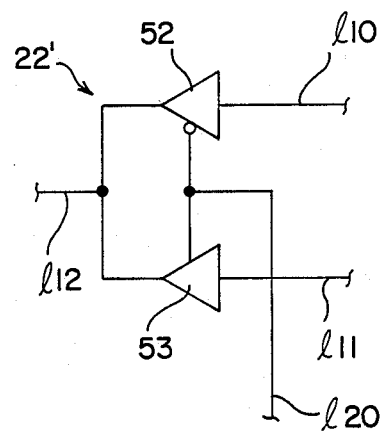
FIG. 2B is another embodiment of the switch circuit 22 included in the card reader shown in FIG. 1.

In above embodiment, setting of the JBA mode is explained. However, in case the ABA mode is designated, similar operations are conducted. The common contact nl of the switch circuit 18 is now switched to the individual contact m2 from the individual contact ml and the common contact n2 of the switch circuit 22 is switched to the individual contact m3 from the individual contact m4. As indicated in FIG. 2A, the switch circuit 18 may be formed by a gate circuit 18' utilizing a pair of tristate buffers 50, 51 and the switch circuit 22 may be formed, as indicated in FIG. 2B, by a gate circuit 22' utilizing a pair of tristate buffers 52, 53.

Figures 3, 4, 5:
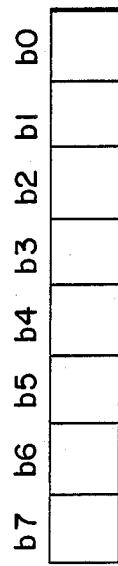
FIG. 3 is a format of data recorded on the magnetic card shown in FIG. 7A for JBA recording.
FIG. 4 is a format of data recorded on the magnetic card shown in FIG. 7B for ABA specification.
FIG. 5 illustrates the store region of a start mark detection register A provided on a processing circuit 13 shown in FIG. 1.

FIG. 3 indicates the format of the data stored in the recording region of the JBA magnetic card C1. FIG. 4 indicates the format of data stored in the recording region of ABA magnetic card C2. As shown in FIG. 3 and FIG. 4, the format of the data stored in both magnetic cards C1 and C2 is formed by start mark, data, end mark and a character LRC for horizontal even number parity check. In the case of the magnetic card C1, one character is formed by 7 bits, 6 bits indicates data and one bit is formed by the even number parity bit. In the case of the magnetic card C2, one character is formed by 5 bits, 4 bits indicates data and one bit is formed by the odd number parity bit.

In the case of international magnetic card C3, data is recorded in the format shown in FIG. 3 on the front surface of the card and data is recorded in the format shown in FIG. 4 on the rear surface surface 1b thereof.

FIG. 5 illustrates a storage region of a register A for start mark detection provided in the processing circuit 13. This register A is formed so that it can sequentially fetch the 8 stored bits of data from the upper most digit bit location b7 to the lower most digit location b0 and the serial data applied to the control circuit 13.

Figure 6:
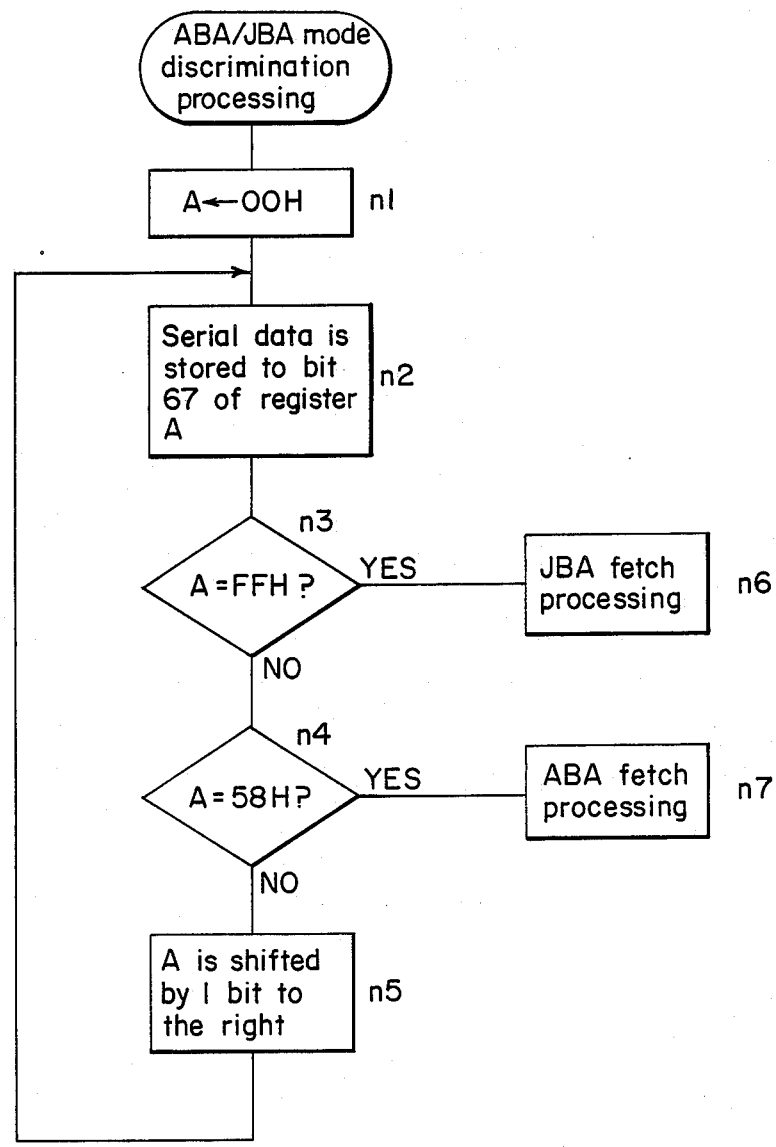
FIG. 6 is a flowchart illustrating the discrimination process for ABA/JBA.

FIG. 6 is a flowchart indicating the ABA/JBA mode discrimination processing in the processing circuit 13. In the step nl, content of register A is set as 00H. Next, in the step n2, the first readout signal or the second readout signal are stored in the upper most bit b7 of the register A. In the step n3, it is determined whether or not the content of the register A is FFH. If it is not, the operation skips to the step n4 and then it is determined whether or not the content of the regiter A is 58H. In the step n4, if the content of the register A is not 58H, content of the register A is shifted to the right by one bit in the step n5. Thereafter, processing returns again to the step n2. As explained above, the steps n2, n3, n4, n5 are sequentially repeated and if content of the register A becomes FFH in the course of the operations, the operation shifts to the step n6 from the step n3 in order to carry out the JBA fetch process. In this fetch process, fetching is carried out without error checks in all 8 bits. After the end mark of FFH is received, if the horizontal even number parity check characters LRC is received or the received data has exceeded 71 characters, the data fetching operation terminates and thereafter various error checks are started.

In the case where the content of the register A becomes 56H in the course of steps n2, n3, n4, n5, the operation shifts to the step n7 from the step n4 in order to conduct the ABA fetching process. Although the start mark of ABA mode is 0BH (5 bits), it becomes 58H when the data is sequentially fetched from the upper most bit b7 of the register A. In the step n7, content is fetched without error checks in every 5 bits. When the horizontal even number parity check character LRC is received or the data has exceeded 39 characters after reception of end mark of 1FH, data fetching terminates and thereafter various error checkes are started.

As explained previously, the processing speed can be improved remarkably owing to the structure configuration in that it is no longer necessary to previously set the fetch process in the control circuit 18 and any fetch processing mode can be executed depending on the readout signal input.

In above embodiment, a magnetic card reader is explained but the present invention can also be suitably applied to a card reader or the like which is employed in an optical recording system.

According to the present invention, either one of the first or second readout signals can be designated preferentially with the priority designating means. Thereby, when a card or the like having the first and second recorded signals an the front surface and the rear surface is read by the first and second headout heads the switching mode can be changed to designate the priority of the first and second switch means for the first and second signal lines.

Moreover, when the card having a magnetic recording region only at the front surface is inserted, only the first read signal is read by the first readout head and the second read signal is not read out from the second readout head. In such a case, the first and the second switch means are changed so that the first switch means becomes conductive and the second switch means becomes nonconductive. Thereby, only the first readout signal is fed through the first signal line.

In addition, when a card having a magnetic recording region only on the rear surface is inserted, the first read signal is not read by the first readout head and only the second read signal is read by the second readout head. In this case, the priority changeover circuit turns off the first switch means and turns on the second switch means. As a result, only the second readout signal is fed through the second signal line.

When a previously designated readout signal is read as explained above, the designated signal is fed with priority and when the designated signal is not readout, another readout signal is provided.

According to the present invention, as explained earlier, either one of the first and second readout signals of the same contents may be provided with priority. In case one of the readout signal is not present, the other readout signal can still be read. Therefore, any type of card where a first or second signal is recorded can be read. In addition, even if an operator sets errorneously the priority of the signal readout the readout signal for the other operation mode not yet preset may be read.

Accordingly, any card can be read accurately with only a single card reader without the need for other type card readers.

While only certain embodiments of the present invention have been described, it will be apparent to those skilled in the art that various changes and modifications may be made therein without departing from the spirit and scope of the present invention as claimed.

What is claimed is:

1. A card reading system comprising:
    a first readout head means for reading a recording region provided on the front surface,
    a second readout head means for reading a recording region provided on the rear surface,
    a first signal line for providing a first readout signal from the first readout head means,
    a second signal line for providing a second readout signal from the second readout head means, and
    a selection means for preferentially selecting with priority the output of either said first signal line or said second signal line.

2. A card reading system for reading the recorded contents of data recorded, at least on one of the front and rear surfaces of a card including recording regions thereon, comprising:
    a first readout head for reading the recording region provided on the front surface,
    a second readout head for reading the recording region provided on the rear surface,
    a first signal line for providing a first readout signal from the first readout head,
    a second signal line for providing a second readout signal from the second readout head,
    a first switch means provided on said first signal line,
    a second switch means provided on said second signal line,
    a means for designating priority for any of the first and second readout signals, and
    a priority changeover circuit which changes the switching mode of the first and second switch means so that only the designated readout signal is output by the priority designating means when first and second readout signals are input or when a signal corresponding to the designated readout signal is input and
    a readout signal is also output when a readout signal other than the signal corresponding to the designated readout signal is input.

3. The card reading system of claim 1, wherein said selection means comprises tristate buffer means.

* * * * *